3,104,976
PROCESS OF PRODUCING A FILLED DOUGHNUT
Howard B. Tolley, Upper Montclair, N.J., assignor to National Biscuit Company, a corporation of New Jersey
No Drawing. Filed Sept. 25, 1961, Ser. No. 140,247
1 Claim. (Cl. 99—86)

This invention relates to an improved fried product, and more particularly concerns a filled fried product such as a filled doughnut or a filled fried pie.

Filled doughnuts are well known in the art. They are generally made from yeast-raised doughs that have been fried in oil, grease or fat for a suitable period of time. The filling operation is performed in a separate step after the doughnuts have been fried by individually injecting them with the desired filling. This requirement for a separate filling step is costly and time consuming. Up to now, there has been no attempt to fill the doughnut before it is fried. The development of this technique would improve the quality of production and would lead to increased popularity of filled doughnuts.

It is therefore an important object of the present invention to provide a method of filling a doughnut prior to the doughnut frying step.

Another object of the invention is to provide a new product comprising a filled doughnut made by filling the doughnut before frying.

Other objects, features, and advantages of the present invention will be apparent from the following detailed description of certain preferred embodiments thereof.

The objects of the invention are accomplished by providing an unbaked cake dough, as distinguished from a yeast-raised dough, filling it with a suitable syrup, jelly or preserve, and cooking the filled dough in a heated oil.

The term, "cake dough," as used herein is intended to apply to the doughs or dough batters which contain baking powder and do not depend upon a yeast action in the forming of the doughnuts. Cake doughs consequently do not require time for proofing after the doughnut is formed and before it can be cooked.

To fill the doughnut of the invention, the filling can be encased between two strips or sheets of cake dough and placed in hot oil for frying. Alternatively, the filling can be deposited along an elongated bottom strip of cake dough and covered with a top layer of cake dough to encase the filling. If the filling is spaced along the strip, a series of filled pockets will be formed which can either be fried as a unit or be severed to form individual filled pockets and then fried. On the other hand, if the filling is deposited in linear fashion along the strip, then a single elongated filled pocket is formed.

Preferably, the filled doughnut of the invention is made by forming a hollow sleeve of the cake dough around an inner core of a filling. This may be accomplished by means of a concentric or compound die comprising a central core die and a generally tubular outer die surrounding the core die. Cake dough batter is extruded through the outer annular die to form a doughnut sleeve which receives and collapses around the core filling discharged from the inner or central die.

In practice excellent results are secured by employing a cake dough containing approximately flour 40 parts, sugar 14 parts, shortening 3 parts, eggs 1 part, leavening 1.2 parts, salt .6 part, flavoring material .25 part, and 26 parts water, although other cake dough formulas may be employed if so desired.

The doughnut may be filled with any suitable flavoring or coloring as desired. Syrups, jams, and jellies are particularly suitable as they do not coagulate or deteriorate under the heat of frying. Other satisfactory fillings are pie fillings, cream type fillings, and peanut butter fillings.

A number of factors influence the frying operation, such as the composition of the dough or the temperature of the frying medium. Hence, the period of immersion of the filled doughnut in the frying medium may vary from about one minute to three minutes. However, the preferred period of frying is from one and a half to two minutes.

The frying medium to be employed in the practice of the invention may be any suitable frying oil, fat or grease, hydrogenated oils being preferred in the present invention.

The following examples are illustrative of the practice of the invention and are not intended to be restrictive of the scope or practice of the invention.

*Example 1*

A cake doughnut batter of the same composition as the previously described cake dough formula is placed in a doughnut machine having an annular die opening at the lower end thereof and a pressure tank for filler material provided with a tubular opening mounted in the center of the annular die. Apple pie filler is placed in the pressure tank. When the machine is turned on, a sleeve of dough is extruded from the die surrounding the proper amount of filler. When the sleeve of filling is cut, it is dropped into a frying chamber where it is fried for approximately two minutes. The resulting product is a palatable fried product that is pleasing in appearance, taste and texture.

*Example 2*

Example 1 is repeated using a pineapple filling. Substantially similar results are obtained.

From the foregoing description it will be seen that the process and product contemplated by this invention results from filling a cake dough before it is fried, thereby obviating the necessity of the present day inefficient step of after-filling the cooked doughnut.

It will be understood that modifications and variations may be effected without departing from the spirit and scope of the invention.

What is claimed is:

Process of producing an edible filled doughnut from cake dough suitable for frying comprising extruding in tubular form a batter of cake dough to form a collapsible elongated cake dough sleeve, simultaneously extruding into said sleeve at least one deposit of a filling immediately prior to the collapse of said sleeve, thereby to encapsulate said filling in said sleeve, and frying said filled sleeve in heated oil.

References Cited in the file of this patent

UNITED STATES PATENTS

| | | |
|---|---|---|
| 651,829 | Copland | June 19, 1900 |
| 1,596,652 | Giovanneti | Aug. 17, 1926 |
| 1,664,337 | Vanderput | Mar. 27, 1928 |
| 1,706,491 | Jenkins | Mar. 26, 1929 |
| 1,933,557 | Kalvin | Nov. 7, 1933 |
| 2,855,305 | Cella | Oct. 7, 1958 |

OTHER REFERENCES

"Everybody's Cook Book," 1937, by Lord, Harcourt, Brace and Co. (New York), pages 174, 175.

"The United States Regional Cook Book," 1947, by Berolzheimer, published by Culinary Arts Inst. (Chicago), pp. 109, 230.

"Baking Industry," Mar. 8, 1958, page 74.